United States Patent [19]
Harris

[11] Patent Number: 5,261,439
[45] Date of Patent: Nov. 16, 1993

[54] VACUUM-ACTUATED VENT ASSEMBLY
[75] Inventor: Robert S. Harris, Connersville, Ind.
[73] Assignee: Stant Manufacturing Inc., Connersville, Ind.
[21] Appl. No.: 937,961
[22] Filed: Aug. 28, 1992

Related U.S. Application Data
[62] Division of Ser. No. 660,340, Feb. 22, 1991, Pat. No. 5,156,178.

[51] Int. Cl.$^5$ .............................................. F16K 17/36
[52] U.S. Cl. ...................... 137/43; 123/516; 137/493.2; 137/587; 220/746
[58] Field of Search .............. 123/516, 520; 137/43, 137/493.2, 493.3, 587; 220/746

[56] References Cited
U.S. PATENT DOCUMENTS

| | | | |
|---|---|---|---|
| 1,118,394 | 11/1914 | Bullock | 137/493.2 |
| 4,000,828 | 1/1977 | Crute et al. | 137/43 X |
| 4,033,475 | 7/1977 | Evans | 137/43 X |
| 4,280,529 | 7/1981 | Silvestri | 137/493.3 |
| 4,699,638 | 10/1987 | Harris | 220/746 X |
| 4,742,840 | 5/1988 | Takahashi et al. | 137/43 |
| 4,877,146 | 10/1989 | Harris | 220/746 |
| 5,028,244 | 7/1991 | Szlaga | |

OTHER PUBLICATIONS
Prior Art Engineering Drawing Showing an AC-Rochester, Manifold Vacuum Actuated Vent Valve Assembly (undated).

*Primary Examiner*—Robert G. Nilson
*Attorney, Agent, or Firm*—Barnes & Thornburg

[57] ABSTRACT

An apparatus is provided for controlling discharge of fuel vapor from an aperture in a vehicle fuel tank. The apparatus includes a housing mounted in the aperture and a vent valve received in the housing for movement between a closed position blocking flow of fuel vapor from the vehicle fuel tank to a vapor recovery canister and an open position allowing flow of fuel vapor from the fuel tank to the vapor recovery canister. The apparatus also is configured to use vacuum from an external supply source to move the vent valve from the closed position to the open position.

65 Claims, 4 Drawing Sheets

VACUUM-ACTUATED VENT ASSEMBLY

This is a division of application Ser. No. 07/660,340 filed Feb. 22, 1991, now U.S. Pat. No. 5,156,178.

BACKGROUND AND SUMMARY OF THE INVENTION

The present invention relates to devices for controlling discharge of fuel vapor from vehicle fuel tanks. More particularly, the present invention relates to venting assemblies adapted to use vacuum from an external source to initiate venting of pressurized fuel vapor from a vehicle fuel tank during vehicle operation.

One common problem in the design of vehicle fuel systems is the provision of a sturdy, compact vent assembly adapted to provide generally unrestricted venting of pressurized fuel vapor from the vehicle fuel tank during normal operation of the vehicle. A well-designed venting assembly provides for venting of fuel vapor at relatively high flow rate to a vapor recovery canister or the like to maintain acceptable levels of fuel vapor pressure in the vehicle fuel tank.

In designing assemblies to provide venting at high vapor flow rates, engineers have experimented with a wide variety of valve structures. One convenient alternative is a vent valve which is actuated by vacuum. The vacuum manifold of a typical vehicle engine provides a suitable external vacuum source for such a vent assembly. When the engine is running during normal vehicle operation, a vacuum is established to actuate the vent valve to allow venting of fuel vapor. Vacuum-actuated venting assemblies have been generally located at or near the vacuum manifold of the vehicle engine.

Vapor venting assemblies preferably also perform a variety of additional functions. One function usually provided by a conventional venting assembly is rollover closure. The venting assembly should be designed to quickly close in response to changes in the attitude of the vehicle fuel tank in excess of a predetermined amount, e.g., during rollover of a vehicle in an accident. Rapid closure of the venting assembly is important to prevent leakage of liquid fuel or fuel vapor from the venting assembly. Rollover valve assemblies are generally adapted for mounting directly in fuel tanks.

In addition, venting assemblies are sometimes provided with vacuum-relief valves which open in response to the onset of vacuum conditions in the vehicle fuel tank. When the temperature of the vehicle fuel tank drops the fuel vapor pressure in the vehicle fuel tank can drop to below a predetermined level lower than atmospheric pressure. A vacuum-relief valve is typically configured to allow air to enter the fuel tank, thereby returning the pressure in the vehicle fuel tank to an acceptable level.

Such vacuum-relief valves have been adapted for mounting in the fuel cap installed on a filler neck of a vehicle fuel tank. However, these vacuum-relief valves are typically directly exposed to atmospheric dust during operation. Upon ingestion of the dust, the valves tend to develop leaks and require replacement under warranty protection.

According to the present invention, a vacuum-actuated venting assembly is provided which is adapted to be mounted directly in an aperture in a vehicle fuel tank. The venting assembly includes a hollow housing mounted in the aperture and means for partitioning the hollow housing into a vent chamber exposed to fuel vapor from the vehicle fuel tank and an outlet chamber. The partition means is formed to include a vent opening.

A vent valve is mounted in the housing for movement between a closed position blocking the flow of fuel vapor between the vent chamber and the outlet chamber through the vent opening and an open position allowing flow of fuel vapor from the vent chamber through the vent opening to the outlet chamber. In addition, the apparatus includes means for using vacuum to move the vent valve between the closed position and the open position.

Moreover, the vacuum-actuated venting assembly of the present invention integrates venting with other functions typically performed in conventional tank-mounted venting assemblies. Thus, the venting assembly of the present invention provides a unitary, compact housing adapted to be mounted directly in the fuel tank and designed to include a vacuum-actuated venting feature as well as additional features.

One additional feature of a preferred embodiment of the present invention is a rollover valve assembly which is advantageously adapted to be received in the same housing which contains the vacuum-actuated vent valve. Specifically, the housing is formed to include a valve chamber and a rollover valve assembly is received in the valve chamber for movement therein. The vent assembly further includes second means for providing a partition between the vent chamber and the valve chamber. The second partition means is formed to include a vent opening, and the rollover valve assembly serves as means for blocking flow of fuel vapor and liquid fuel through the second vent opening in response to a change in vehicle attitude in excess of a predetermined amount.

Another feature of preferred embodiments of the present invention is a vacuum-relief assembly. In some embodiments, the vacuum-relief assembly is appended to the vent valve for movement therewith and extends through the vent valve. The vacuum-relief assembly includes a vacuum relief conduit and a relief valve positioned in the vacuum relief conduit. The relief valve is configured to move in response to fuel tank vacuum conditions to an open position allowing air to flow into the fuel tank to relieve the tank vacuum. Under conditions where substantial air flow is required to relieve the tank vacuum condition, the vacuum-relief assembly assists in moving the vent valve to its open position, thereby allowing make-up air flow in reverse flow from the atmosphere past the open vent valve to the fuel tank.

Advantageously, air flowing in reverse flow past the open vent valve must first pass through a vapor recovery canister where dust can be removed from the air. Thus, the potential for dust ingestion by the vacuum-relief valve is substantially reduced.

Moreover, The use of the fuel vapor vent path for reverse air flow allows vacuum relief to occur rapidly—i.e, at high air flow rates. The need for such high air flow is particularly acute when the fuel tank experiences a sudden temperature drop as might occur, e.g., when the vehicle is driven into a car wash where underspray can contact the fuel tank. Advantageously, the present invention provides a high-flow vacuum-relief mechanism specially configured to be integrated into a tank venting assembly.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
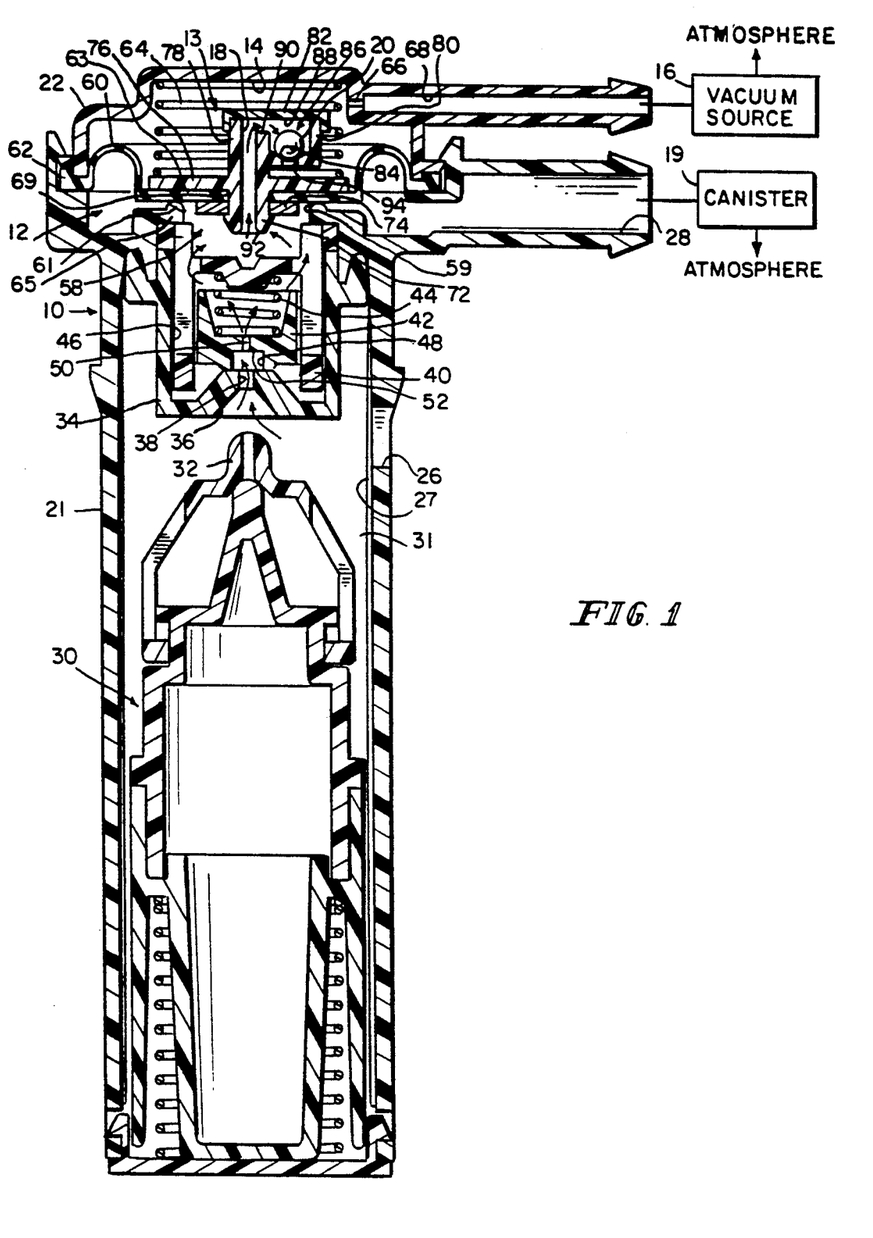
FIG. 1 is a sectional view of one embodiment of a vacuum-actuated venting assembly in accordance with the present invention showing a diaphragm vent valve assembly in its closed position and a ball relief valve appended to the vent valve assembly for movement therewith.

One embodiment of a vacuum-actuated venting assembly in accordance with the present invention is illustrated in FIG. 1. The venting assembly includes a housing 10 adapted to be mounted in an aperture in the wall of a vehicle fuel tank. A vent valve assembly 12 is mounted in housing 10 for movement therein to provide venting of fuel vapor from the vehicle fuel tank at relatively high vapor flow rates (see FIG. 2). A vacuum-relief valve assembly 13 is appended to vent valve assembly 12 for movement therewith and is configured to move to an open position to allow air to enter the vehicle fuel tank when the fuel vapor pressure in the fuel tank drops to below a predetermined level due, e.g., to sudden cooling (See FIG. 3). A rollover valve assembly 30 is also received in housing 10 for movement therein to provide means for blocking flow of fuel vapor when the vehicle fuel tank rolls over or experiences a change in attitude in excess of a predetermined amount. Advantageously, then, the venting assembly of FIG. 1 provides an integrated package capable of performing vapor venting, rollover closure, and vacuum relief functions.

Moreover, the venting assembly also includes means for using vacuum to move vent valve assembly 12 to an open position allowing fuel vapor to vent from the fuel tank to an outlet chamber 28 and thence to a vapor recovery canister 19 or the like. An external vacuum source 16 acts via a passageway 68 to control the pressure in a control chamber 14. Vacuum source 16 can be actuated to reduce the pressure in control chamber 14 sufficiently to cause vent assembly 12 to move to a position allowing fuel vapor venting.

Housing 10 includes a cylindrical portion 21 extending into the fuel tank, a cover 22 which snap fits onto the cylindrical portion at an upper end thereof, and a retainer 24 which snap fits onto the cylindrical portion at a lower end thereof. Cylindrical portion 21 is formed to include an inlet 26 allowing fuel vapor from the fuel tank to pass therethrough.

Housing 10 also includes a hollow interior 27 which is partitioned into a rollover valve chamber 31, a vent chamber 58, an outlet chamber 28, and control chamber 14. A first vent opening 59 connects vent chamber 31 and outlet chamber 28 in fluid communication. A second vent opening 38 connects vent chamber 58 and rollover valve chamber 31 in fluid communication.

Rollover valve chamber 31 is defined by cylindrical portion 21 of housing 10, retainer 24, and walls of an insert 34 which snap fits into hollow interior 27 of housing 10. Insert 34 also provides a valve seat 36 for rollover valve assembly 30 and is formed to include vent opening 38. Insert 34 provides means for providing a partition between vent chamber 58 and rollover valve chamber 31.

Rollover valve assembly 30 is received in rollover valve chamber 31 for movement therein to provide means for regulating or selectively blocking flow of fuel vapor through second vent opening 38. The particular rollover valve assembly illustrated in FIGS. 1-5 is described in more detail in U.S. patent application Ser. No. 07/546,913 filed Jun. 27, 1990. That description is incorporated by reference herein. Of course, it will be understood that other types of rollover valves, including float valves, inertial ball-and-ramp type valves, and others, may be used in accordance with the invention to provide rollover closure.

Rollover valve assembly 30 includes a nipple 32 adapted to seat against valve seat 36 to prevent the flow of fuel vapor through vent opening 38 during tilting of the vehicle fuel tank in excess of a predetermined amount. Changes in vehicle fuel tank attitude in excess of a predetermined amount cause rollover valve assembly 30 to move in rollover valve chamber 31 to place nipple 32 in engagement with valve seat 36. Fuel vapor and liquid fuel which has entered rollover valve chamber 31 through, e.g., inlet 26 is thereby prevented from leaking through vent opening 38. Thus, rollover valve assembly 30 can provide upstream means for regulating flow of fuel vapor through second vent opening 38 to the vent chamber 58.

Figure 2:
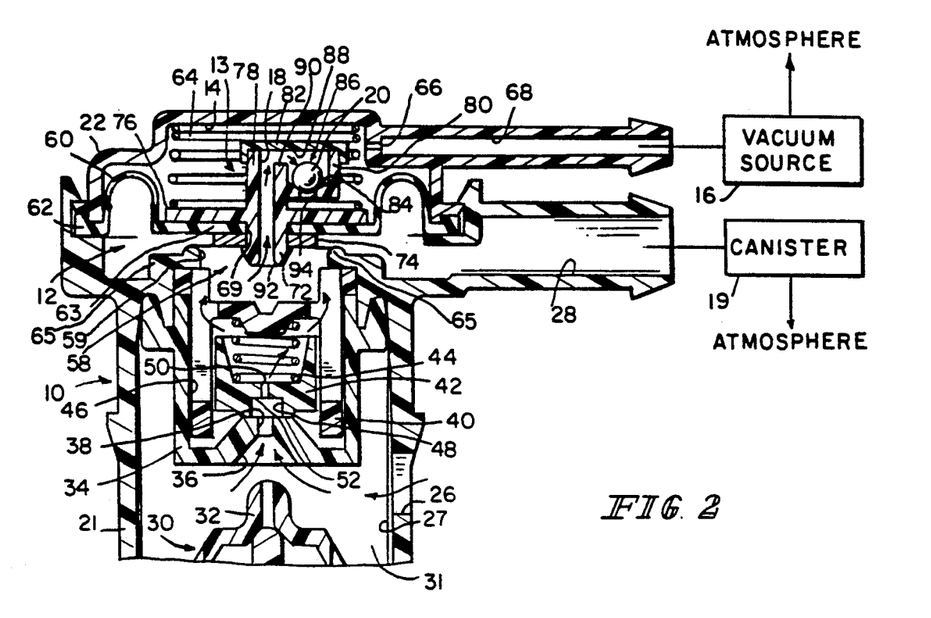
FIG. 2 is a sectional view of the venting assembly of FIG. 1 showing the diaphragm vent valve in its open position as during operation of the vehicle.

Vent chamber 58 is normally bounded by walls of insert 34, an interior wall 65 of housing 10, and by a portion 63 of vent valve assembly 12. Of course, when vent valve assembly 12 moves to its open position as illustrated in FIG. 2, vent chamber 58 is linked in fluid communication with outlet chamber 28 by way of vent opening 59.

An interior wall 65 in which vent opening 59 is formed provides means for providing a partition between vent chamber 58 and outlet chamber 28. Likewise, wall 65 and vent opening 59 provide means for establishing a flow path for conducting fuel vapor from vent chamber 58 to outlet chamber 28 when vent assembly 12 is positioned as shown in FIG. 2—e.g., during engine operation.

A foundation 40 is mounted within insert 34 in a vent chamber. Foundation 40 defines a cavity in which a pressure relief valve 42 is mounted for movement relative to foundation 40. A spring 44 acts against foundation 40 to bias pressure relief valve 42 into sealing engagement with insert 34. Thus, pressure relief valve 42 provides downstream means for regulating flow of fuel vapor through vent opening 38. Foundation 40 is also formed to include a plurality of vertically-extending openings 46 allowing passage of fuel vapor therethrough.

Pressure relief valve 42 is formed to include a cavity 48 located to receive fuel vapor discharged from the vehicle fuel tank through vent opening 38. Pressure relief valve 42 is also formed to include a central aperture 50. In a preferred embodiment, the diameter of central aperture 50 is about half the diameter of vent opening 38.

Pressure relief valve 42 cooperates with foundation 40 to provide a two-stage means for regulating flow of fuel vapor from the rollover valve chamber 31 to a vent chamber 58. Specifically, during first stage venting, pressurized fuel vapor passes only through central aperture 50 because the pressure of fuel vapor acting against a floor 50 in cavity 48 of pressure relief 42 is insufficient to overcome the biasing force applied by spring 44. Fuel vapor passes through central aperture 50 and then through vertically extending openings 46. In effect, central aperture 50 governs flow at this point.

During second stage venting, the pressure fuel vapor in cavity 48 is sufficient to move the pressure relief valve 42 against the bias of spring 44 to a position out of engagement with insert 34. Fuel vapor passing through vent opening 38 can flow directly through vertically extending openings 46 to reach vent chamber 58. Thus, in this second stage, vent opening 38 effectively governs flow.

Control chamber 14 is bounded by vent valve assembly 12 and by inwardly-directed walls of cover 22. Thus, fuel vapor does not enter control chamber 14. Cover 22 is formed to include an opening 66 leading to a passageway 68. Passageway 68 provides means for connecting control chamber 14 to external vacuum source 16.

In preferred embodiments, vacuum source 16 is a vacuum manifold of a vehicle engine. When the vehicle engine is operating, vacuum manifold 16 operates to reduce pressure in chamber 14 to actuate vent valve assembly 12. Thus, during operation of the vehicle with the engine running, vent valve assembly 12 is positioned as shown in FIG. 2 to allow generally unrestricted venting of fuel vapor to outlet chamber 28 at a relatively high flow rate. Thus, control chamber 14, opening 66, and passageway 68 cooperate to provide means for using vacuum from vacuum source 16 to move vent valve assembly 12 to the position illustrated in FIG. 2. In addition, conduit 18 cooperates with control chamber 14, opening 66, and passageway 68 to provide means for establishing a flow path to conduct air from the atmosphere to vent chamber 58.

Vent valve assembly 12 includes an annular diaphragm 60 having an outer peripheral ridge designed to be sandwiched between cylindrical portion 21 and cover 22. Diaphragm 60 is normally biased by a spring 64 into vapor sealing engagement with an upstanding annular ridge 61 formed on an interior portion of cylindrical portion 21. Spring 64 acts between an inner side 88 of cover 22 and diaphragm 60.

Diaphragm 60 is movable between a closed position (shown in FIG. 1) blocking the flow of fuel vapor through vent opening 59, and an open position (shown in FIGS. 2 and 3) allowing the flow of fuel vapor through vent opening 59 to outlet chamber 28, and thence to canister 19.

Diaphragm 60 includes a central portion 63 and an outer portion surrounding central portion 63. Central portion 63 has a diameter equal to the diameter of vent opening 59 so that fuel vapor in vent chamber 58 impinges upon central portion 63 when vent valve assembly 12 is positioned in the closed position.

Vacuum-relief valve assembly 13 is received in an opening 69 formed in diaphragm 60. At one end, assembly 13 includes an annular lip 72 adapted to trap a backing plate 74 against one side of diaphragm 60. Assembly 13 also includes a disk 76 engaging the opposite side of diaphragm 60, thus ensuring that assembly 13 remains appended to diaphragm 60 for movement therewith.

Assembly 13 includes a cylindrical tube 78 defining vacuum relief conduit 18. As shown, conduit 18 extends through diaphragm 60. An upstanding wall 80 and a portion of cylindrical tube 78 support a cap 82. Vacuum relief conduit 18 includes an opening 92 communicating with vent chamber 58 and an opening 94 communicating with control chamber 14. Conduit 18 thus provides means for conducting air from control chamber 14 to vent chamber 58.

Relief valve 20, preferably a ball relief valve, is positioned in vacuum relief conduit 18 and is movable between a closed position blocking flow of air from control chamber 14 through vacuum conduit 18 to vent chamber 58 and an open position allowing flow of air from control chamber 14 through vacuum conduit 18 to vent chamber 58. Specifically, relief valve 20 is positioned in a relief valve chamber 86.

Chamber 86 is defined by wall 80, an upper portion 90 of tube 78, and cap 82. Relief valve 20 is sized relative to chamber 86 for movement therein between the closed position and the open position. An annular conical member 84 positioned in vacuum relief conduit 18 provides a valve seat for relief valve 20. Annular conical member 84 is formed to include opening 94 extending therethrough. When valve 20 is in its closed position as illustrated in FIGS. 1 and 2, it lies in sealing engagement with valve seat 84 to prevent the flow of air from control chamber 14 through an opening 94. Under tank vacuum conditions, relief valve 20 moves off valve seat 84 to allow air from control chamber 14 to pass through opening 94.

Figure 3:
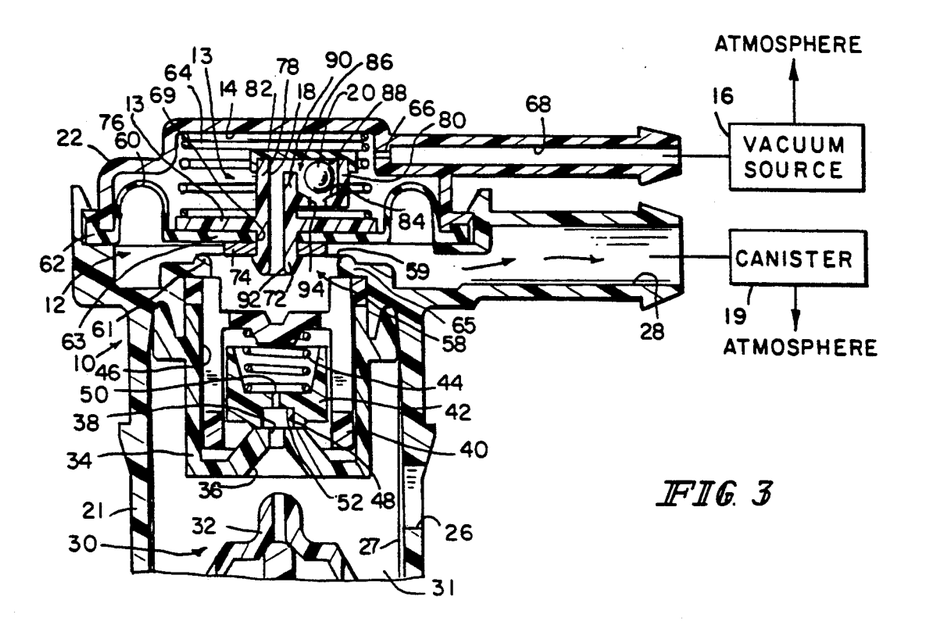
FIG. 3 is a sectional view of the venting assembly of FIG. 1 showing the diaphragm vent valve in its open position and the ball relief valve in its open position in response to vacuum conditions in the vehicle fuel tank.

Operation of the apparatus of FIG. 1 is illustrated in FIGS. 2-3. In FIG. 2, the apparatus is shown during normal operation of the vehicle with the vehicle engine running. In this situation, vacuum source 16 is actuated to act through passageway 68 to reduce the pressure in control chamber 14. Thus, the pressure on the side of diaphragm 60 exposed to chamber 14 lessens.

At the same time, pressurized fuel vapor from the vehicle fuel tank passes from rollover valve chamber 31 through vent opening 38 and further through central aperture 50 and vertically extending openings 46 to reach vent chamber 58. There, the pressurized fuel vapor impinges upon a central portion 63 of diaphragm 60.

Eventually, the fuel vapor pressure in vent chamber 58 relative to the air pressure in control chamber 14 is high enough to move diaphragm 60 out of engagement with the ridge 61 against the bias of spring 64. Fuel vapor in vent chamber 58 is then able to vent through vent opening 59 to reach outlet chamber 28 and, thereafter, recovery canister 19. Advantageously, then, the valve of the illustrated embodiment includes means for using vacuum from the vacuum manifold of the vehicle engine to provide tank venting while the engine is running.

In FIG. 3, operation of the apparatus during a sudden cool down of the vehicle fuel tank is shown. When the temperature of the vehicle fuel tank drops, the fuel vapor pressure in the vehicle fuel tank can be reduced to below a predetermined level. Under such a "tank vacuum" condition, the negative pressure acting through conduit 18 will exert a force sufficient to overcome the force of gravity acting on ball 20. Thus, ball valve 20 will lift off its valve seat 84 to allow air in control chamber 14 to enter relief valve chamber 86 through opening 94. From chamber 86, the air can flow down conduit 18 to reach vent chamber 58. The ambient air next can pass in reverse flow through vertically extending openings 46, central aperture 50, and vent opening 38, finally reaching rollover valve chamber 31.

As the flow of air continues—e.g., in response to a strong tank vacuum condition—the pressure in control chamber 14 and in vent chamber 58 equalizes. However, there is an area differential between the area of diaphragm 60 exposed to pressure in vent chamber 58 (i.e., central portion 63) and the area of diaphragm exposed to pressure in control chamber 14 (i.e., the entire diaphragm 60). The corresponding force differential is sufficient to lift vent valve assembly 12 to its open position out of engagement with ridge 61, thereby allowing air from the atmosphere to pass in reverse flow through canister 19 to outlet chamber 28, then to vent chamber 58, and then to the vehicle fuel tank.

Advantageously, high flow rates of air can pass into the vehicle fuel tank, thus providing rapid vacuum relief to the vehicle fuel tank. That is, vacuum-relief valve assembly 13 acts to assist in lifting vent valve assembly 12 to the open position in response to significant levels of tank vacuum. The venting flow path (i.e., the path from vent chamber 58 to canister 19) is advantageously used for reverse air flow to provide vacuum relief at air flow rates higher than the air flow rate through, e.g., conduit 18 alone.

A further advantage of this design is that the air flow passing in reverse flow through the venting flow path must pass through canister 19 before it enters outlet chamber 28. While canister 19 serves primarily to recover selected components of fuel vapor venting from the fuel tank, canister 19 can also recover dust from air as the air passes through canister 19 in reverse flow. Thus, the vacuum-relief valve assembly of the present invention is less susceptible to dust ingestion than is a conventional assembly.

Figure 4:
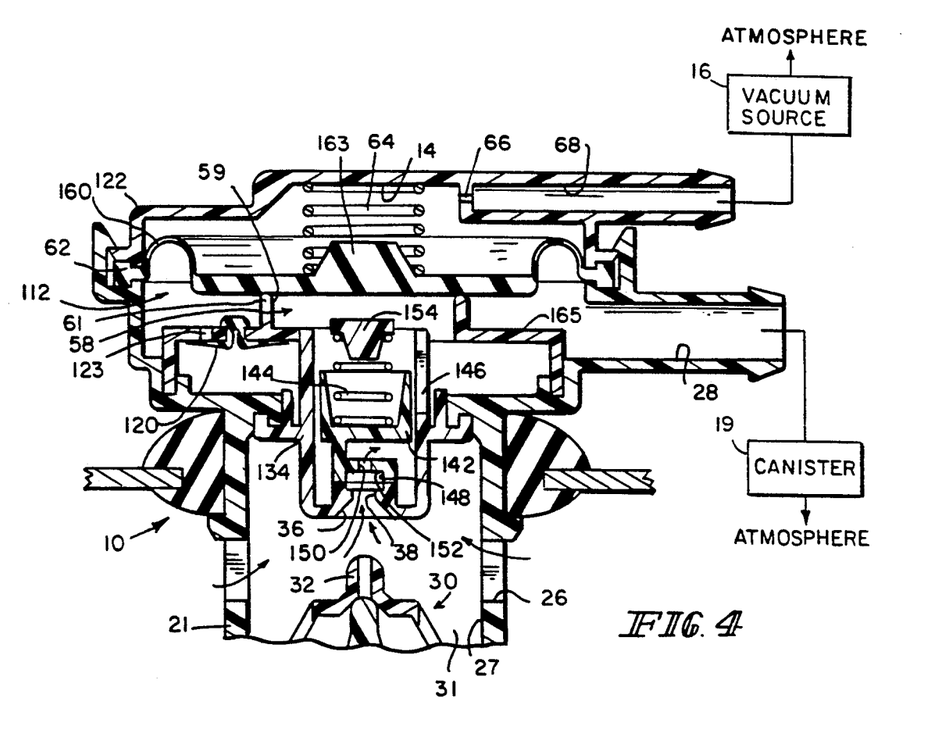
FIG. 4 is a sectional view of another embodiment of a venting assembly in accordance with the present invention showing a diaphragm vent valve in its closed position with the vehicle engine off.

Another embodiment of the invention is shown in FIG. 4. In FIG. 4, parts having reference numerals similar to those in FIGS. 1-3 perform similar functions. In this embodiment, a pressure relief valve 142 is received directly in an insert 134 for movement therein. A spring 144 acts between a spring seat 154 and pressure relief valve 142 to normally bias pressure relief valve 142 into engagement with insert 134.

Pressure relief valve 142 cooperates with insert 134 to provide two-stage venting. During first stage venting, pressurized fuel vapor passes through central aperture 150 and thence through vertically extending openings 146 formed in insert 134. During second stage venting, pressure relief valve 142 is moved against the bias of spring 144 out of engagement with insert 134 to allow venting directly from vent opening 38 through vertically extending openings 146 to vent chamber 58.

In the embodiment of FIG. 4, an umbrella valve 120 provides vacuum relief. In response to reduction of fuel vapor pressure in the vehicle fuel tank to below a predetermined level, umbrella valve 120 moves to uncover passageway 123. Ambient air in outlet chamber 28 can then flow through passageway 123 to reach the vehicle fuel tank. In other respects, the apparatus of FIG. 4 operates in a fashion similar to that of FIGS. 1-3.

Figure 5:
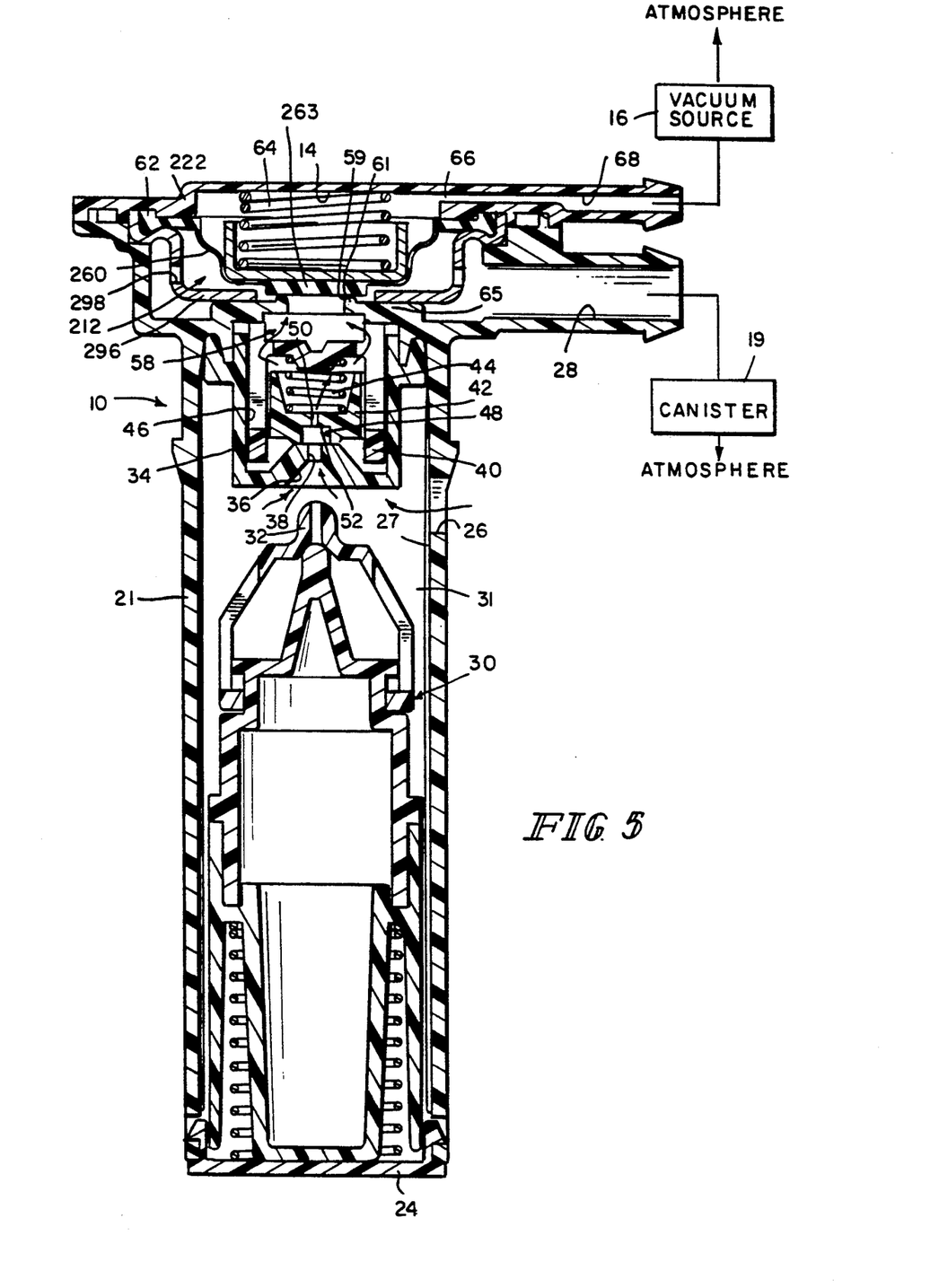
FIG. 5 is a sectional view of yet another embodiment of a venting assembly in accordance with the present invention showing a diaphragm vent valve in its closed position with the vehicle engine off.

Yet another embodiment of a vent assembly according to the present invention is illustrated in FIG. 5. In FIG. 5, parts having reference numbers similar to those in FIGS. 1-4 perform similar functions. In the apparatus of FIG. 5, no provision is made for vacuum relief of the vehicle fuel tank. A retainer 296 lies in the flow path of fuel vapor venting from vent chamber 58 through vent opening 59 to outlet chamber 28. Retainer 296 is formed to include an opening 298 to allow passage of fuel vapor therethrough. In other respects, the vent assembly of FIG. 5 operates in a fashion similar to the vent assemblies of FIGS. 1-4.

Although the invention has been described in detail with reference to certain preferred embodiments, variations and modifications exist within the scope and spirit of the invention as described and defined in the following claims.

What is claimed is:

1. An apparatus for controlling discharge of fuel vapor from an aperture in a vehicle fuel tank, the apparatus comprising a housing mounted in the aperture, the housing being formed to include a hollow interior having a vent chamber, an outlet chamber, and a valve chamber, first partition means for providing a partition between the outlet chamber and the vent chamber, the first partition means being formed to include a first vent opening, second partition means for providing a partition between the vent chamber and the valve chamber, the second partition means being formed to include a second vent opening, means for blocking flow of fuel vapor and liquid fuel through the second vent opening in response to a change in vehicle fuel tank attitude in excess of a predetermined amount, the blocking means being received in the valve chamber for movement therein, a vent valve mounted in the housing for movement between a closed position blocking the flow of fuel vapor between the vent chamber and the outlet chamber through the first vent opening and an open position allowing flow of fuel vapor from the vent chamber through the first vent opening to the outlet chamber, means for using vacuum to move the vent valve from the closed position to the open position, the using means including a control chamber and an external vacuum supply line, the vent valve being mounted to communicate with vacuum extant in the control chamber, conduit means for communicating negative pressure from the vehicle fuel tank through the second vent opening to the control chamber in the using means to generate a vacuum in the control chamber without using the external vacuum supply line, the conduit means extending through the vent valve, and a relief valve positioned in the conduit means and movable between a closed position blocking flow of air from the control chamber in the using means through the conduit means to the vehicle fuel tank and an open position allowing flow of negative pressure from the vehicle fuel tank through the conduit means and through the second vent opening to the control chamber to generate a suction force moving the vent valve from the closed position to the open position in response to reduction of fuel vapor pressure in the vehicle fuel tank to below a predetermined level so that ambient air in the outlet chamber flows into the vehicle fuel tank through the first vent opening to increase the fuel vapor pressure in the vehicle fuel tank.

2. An apparatus for controlling discharge of fuel vapor from an aperture in a vehicle fuel tank, the apparatus comprising a housing mounted in the aperture, the housing being formed to include a hollow interior having a vent chamber and an outlet chamber, means for providing a partition between the outlet chamber and the vent chamber, the partition means being formed to include a vent opening, a vent valve mounted in the housing for movement between a closed position blocking the flow of fuel vapor between the vent chamber and the outlet chamber through the vent opening and an open position allowing flow of fuel vapor from the vent chamber through the vent opening to the outlet chamber, means for using vacuum to move the vent valve from the closed position to the open position, the using means including a control chamber and an external vacuum supply line, the vent valve being mounted to communicate with vacuum extant in the control chamber, conduit means for communicating negative pressure from the vehicle fuel tank to the control chamber in the using means to generate a vacuum in the control chamber without using the external vacuum supply line, the conduit means extending through the vent valve, and a relief valve positioned in the conduit means and movable between a closed position blocking flow of air from the control chamber in the using means through the conduit means and an open position allowing flow of negative pressure from the vehicle fuel tank through the conduit means to the control chamber to generate a suction force moving the vent valve from the closed position to the open position in response to reduction of fuel vapor pressure in the vehicle fuel tank to below a predetermined level so that ambient air in the outlet chamber flows into the vehicle fuel tank to increase the fuel vapor pressure in the vehicle fuel tank.

3. The apparatus of claim 2, further comprising second means for providing a partition between the vent chamber and the vehicle fuel tank, the second partition means being formed to include a second vent opening, and means for regulating flow of fuel vapor through the second vent opening to the vent chamber.

4. The apparatus of claim 3, wherein the regulating means includes a rollover valve.

5. The apparatus of claim 3, wherein the regulating means includes a float valve.

6. The apparatus of claim 3, wherein the regulating means includes a pressure-relief valve.

7. The apparatus of claim 3, wherein the vent valve includes a central portion and an outer portion surrounding the central portion, the central portion having a diameter equal to the diameter of the vent opening, the vent valve being positioned so that fuel vapor in the vent chamber impinges upon the central portion when the vent valve is in the closed position.

8. An apparatus for controlling discharge of fuel vapor from an aperture in a fuel tank, the apparatus comprising a housing mounted in the aperture, the housing being formed to include an interior region, means for partitioning the interior region of the housing to define a vent chamber communicating with the fuel tank and an outlet chamber communicating with the atmosphere, the partition means including means for providing a vent opening within the housing between the vent chamber and the outlet chamber, a vent valve mounted in the housing for movement between a closed position blocking flow of fuel vapor from the vent chamber through the vent opening to the outlet chamber and an open position allowing flow of fuel vapor from the vent chamber through the vent opening to the outlet chamber, means for using vacuum to move the vent valve from the closed position to the open position, the using means including a control chamber in the housing, the vent valve being mounted to communicate with vacuum extant in the control chamber, and a vacuum relief conduit extending through the vent valve and connecting the vent chamber and the control chamber in fluid communication, and a relief valve positioned in the vacuum relief conduit and movable in response to the reduction of fuel vapor pressure in the fuel tank to below a predetermined level between a closed position blocking flow between the vent chamber and the control chamber and an open position allowing flow between the vent chamber and the control chamber to reduce the pressure in the control chamber so that the vent valve moves from its closed position to its open position allowing ambient air to flow from the outlet chamber to the vent chamber.

9. The apparatus of claim 8, wherein the using means further includes means for connecting the control chamber to a vacuum source in a vehicle engine so that vacuum is provided by the vacuum source to the control chamber during operation of the vehicle to move the vent valve to the open position.

10. The apparatus of claim 8, wherein the using means includes a valve seat positioned in the vacuum relief conduit.

11. The apparatus of claim 10, wherein the vacuum relief conduit is formed to include a passageway communicating with the vent chamber, the valve seat is formed to include an opening extending therethrough and connecting the control chamber and the passageway in fluid communication, and the relief valve is sized to sit on the valve seat and close the opening upon movement to its closed position.

12. The apparatus of claim 8, wherein the vacuum relief conduit includes a relief valve chamber and the relief valve is located in the relief valve chamber and sized relative to the relief valve chamber for movement therein between the closed position and the open position in response to the reduction of fuel vapor pressure in the vehicle fuel tank to below a predetermined level.

13. The apparatus of claim 12, wherein the relief valve is a ball and the apparatus further comprises a conical member positioned in the relief valve chamber to provide a seat for the ball.

14. The apparatus of claim 8, further comprising a tube defining the vacuum relief conduit, the tube being appended to the vent valve for movement therewith.

15. The apparatus of claim 8, wherein the vent valve includes a central portion and an outer portion surrounding the central portion, the central portion having a diameter equal to the diameter of the vent opening, the vent valve being positioned so that fuel vapor impinges upon the central portion when the vent valve is in the closed position.

16. The apparatus of claim 8, further comprising partition means for providing a partition between the vent chamber and the vehicle fuel tank, the partition means being formed to include a second vent opening, and pressure relief means for regulating flow of fuel vapor through the second vent opening to the vent chamber.

17. An apparatus for controlling discharge of fuel vapor from an aperture in a vehicle fuel tank, the apparatus comprising
  a housing mounted in the aperture, the housing being formed to include an interior region,
  means for partitioning the interior region of the housing to define a vent chamber communicating with the fuel tank and an outlet chamber communicating with the atmosphere, the partition means including means for providing a vent opening within the housing between the vent chamber and the outlet chamber,
  a vent valve mounted in the housing for movement between a closed position blocking flow of fuel vapor from the vent chamber through the vent opening to the outlet chamber and an open position allowing flow of fuel vapor from the vent chamber through the vent opening to the outlet chamber,
  means for using vacuum to move the vent valve from the closed position to the open position, the using means including a control chamber in the housing, the vent valve being mounted to communicate with vacuum extant in the control chamber, and a vacuum relief conduit connecting the vent chamber and the control chamber in fluid communication,
  means for coupling the vacuum relief conduit to the vent valve so that the vacuum relief conduit moves with the vent valve, and
  a relief valve positioned in the vacuum relief conduit and movable in response to the reduction of fuel vapor pressure in the fuel tank to below a predetermined level between a closed position blocking flow between the vent chamber and the control chamber and an open position allowing flow between the vent chamber and the control chamber to reduce the pressure in the control chamber so that the vent valve moves from its closed position to its open position allowing ambient air to flow from the outlet chamber to the vent chamber.

18. The apparatus of claim 17, wherein the using means further includes means for connecting the control chamber to a vacuum source in a vehicle engine so that vacuum is provided by the vacuum source to the control chamber during operation of the vehicle to move the vent valve to the open position.

19. The apparatus of claim 17, wherein the using means includes a valve seat positioned in the vacuum relief conduit.

20. The apparatus of claim 19, wherein the vacuum relief conduit is formed to include a passageway communicating with the vent chamber, the valve seat is formed to include an opening extending therethrough and connecting the control chamber and the passageway in fluid communication, and the relief valve is sized to sit on the valve seat and close the opening upon movement to its closed position.

21. The apparatus of claim 17, wherein the vacuum relief conduit includes a relief valve chamber and the relief valve is located in the relief valve chamber and sized relative to the relief valve chamber for movement therein between the closed position and the open position in response to the reduction of fuel vapor pressure in the vehicle fuel tank to below a predetermined level.

22. The apparatus of claim 21, wherein the relief valve is a ball and the apparatus further comprises a conical member positioned in the vacuum relief conduit to provide a seat for the ball.

23. The apparatus of claim 17, wherein the vacuum relief conduit extends through the vent valve.

24. The apparatus of claim 17, wherein the coupling means includes a disk integral with the vacuum relief conduit and engaging a first side of the vent valve and a plate engaging an opposite side of the vent valve.

25. The apparatus of claim 24, wherein the vacuum relief conduit includes means for retaining the plate in engagement with the vent valve.

26. The apparatus of claim 24, further comprising means for yieldably biasing the vent valve toward its closed position, the biasing means extending between the housing and the disk and retaining the disk in engagement with the vent valve.

27. The apparatus of claim 26, wherein the biasing means is a coiled compressing spring having an interior region and the relief valve is situated to lie in the interior region of the coiled compression spring.

28. The apparatus of claim 27, wherein the vacuum relief conduit is formed to include a first passageway opening into the vent chamber, and a laterally offset second passageway connecting to the first passageway and opening into the control chamber, and means in the second passageway for supporting the relief valve in its closed position.

29. The apparatus of claim 17, further comprising means for yieldably biasing the vent valve toward its closed position, the biasing means engaging the housing and the vacuum relief conduit.

30. The apparatus of claim 29, wherein the biasing means is a coiled compression spring having an interior region and the relief valve is situated to lie in the interior region of the coiled compression spring.

31. The apparatus of claim 30, wherein the vacuum relief conduit is formed to include a first passageway opening into the vent chamber, and a laterally offset second passageway connecting to the first passageway and opening into the control chamber, and means in the second passageway for supporting the relief valve in its closed position.

32. The apparatus of claim 30, wherein the vacuum relief conduit includes a housing formed to include an interior chamber containing the relief valve and a top opening lying in the interior region of the coiled compression spring and providing means for accessing the interior chamber of the vacuum relief conduit and cap means for engaging the housing to close the top opening and retain the relief valve in the housing.

33. An apparatus for controlling discharge of fuel vapor from an aperture in a vehicle fuel tank, the apparatus comprising
  a housing mounted in the aperture, the housing being formed to include a hollow interior,
  means for partitioning the hollow interior into a valve chamber, a vent chamber, and an outlet chamber, the partition means being formed to include a first vent opening between the vent chamber and the outlet chamber and a second vent opening between the vent chamber and the valve chamber, first blocking means for selectively blocking flow of fuel vapor through the first vent opening, the first blocking means being mounted in the housing for movement between a first position blocking the flow of fuel vapor between the vent chamber and the outlet chamber and an open position allowing flow of fuel vapor from the vent chamber through the first vent opening to the outlet chamber, means for using vacuum to move the first blocking means from the closed position to the open position, the using means including a control chamber formed in the housing and means for connecting the control chamber to a vacuum manifold of a vehicle engine so that vacuum is provided to the control chamber during operation of the vehicle to move the vent valve to the open position, second blocking means for blocking flow of fuel vapor and liquid fuel through the second vent opening in response to a change in vehicle fuel tank attitude in excess of a predetermined amount, the blocking means being received in the valve chamber for movement therein, conduit means for communicating negative pressure from the vehicle fuel tank to the control chamber, the conduit means extending through the first blocking means, and third blocking means for selectively blocking flow of air through the conduit means, the third blocking means being positioned in the conduit means and movable between a closed position preventing flow of air from the control chamber to the vent chamber and an open position allowing flow of negative pressure from the vehicle fuel tank through the conduit means to the control chamber to generate a suction force moving the first blocking means from the first position to the second position in response to the reduction of fuel vapor pressure in the vehicle fuel tank to below a predetermined level so that ambient air in the outlet chamber flows into the vehicle flow tank through the second vent opening to increase the fuel vapor pressure in the vehicle fuel tank.

34. The apparatus of claim 33, wherein the third blocking means includes a relief valve.

35. The apparatus of claim 33, wherein the conduit means is formed to include a chamber and the third blocking means is positioned in the chamber and sized relative to the chamber for movement therein between the closed position and the open position.

36. The apparatus of claim 33, wherein the conduit means includes a tube appended to the first blocking means for movement therewith.

37. An apparatus for controlling discharge of fuel vapor from an aperture in a vehicle fuel tank, the apparatus comprising a housing mounted in the aperture, the housing being formed to include a hollow interior, means for partitioning the hollow interior into a valve chamber, a vent chamber, and an outlet chamber, the partitioning means being formed to include a first vent opening between the vent chamber and the outlet chamber and a second vent opening between the valve chamber and the vent chamber, first blocking means for blocking flow of fuel vapor through the first vent opening, the first blocking means being mounted in the housing for movement between a closed position blocking the flow of fuel vapor between the vent chamber and the outlet chamber through the first vent opening and an open position allowing the flow of fuel vapor from the vent chamber through the first vent opening to the outlet chamber, means for using vacuum to move the vent valve from the closed position to the open position, means for regulating the flow of fuel vapor from the valve chamber through the second vent opening to the vent chamber, the regulating means being positioned in the vent chamber for movement therein, conduit means for communicating fluid between the using means and the vehicle fuel tank, the conduit means extending through the first blocking means, and second blocking means for blocking flow of fluid through the conduit means, the second blocking means being positioned in the conduit means and movable between a closed position blocking flow of fluid from the using means through the conduit means to the vent chamber and an open position allowing flow of fluid between the using means through the conduit means to the vent chamber in response to the reduction of fuel vapor pressure in the vehicle fuel tank to below a predetermined so that negative pressure in the vehicle fuel tank is communicated to the using means to apply a suction force to the first blocking means moving the first blocking means to its open position allowing ambient air in the outlet chamber to flow into the vehicle fuel tank.

38. The apparatus of claim 37, wherein the second blocking means includes a relief valve.

39. The apparatus of claim 37, wherein the conduit means includes a chamber and the second blocking means is positioned in the chamber and sized relative to the chamber for movement therein between the closed position and the open position.

40. The apparatus of claim 37, wherein the conduit means includes a tube appended to the first blocking means for movement therewith.

41. An apparatus for controlling discharge of fuel vapor from an aperture in a fuel tank, the apparatus comprising a housing mounted in the aperture, the housing being formed to include an outlet chamber and having a hollow interior, a vent valve positioned to partition the hollow interior into a vent chamber exposed to fuel vapor pressure from the vehicle fuel tank and a control chamber exposed to air pressure from an external vacuum source, the vent valve being movable between a closed position preventing the flow of fuel vapor from the vent chamber to the outlet chamber and an open position allowing flow of fuel vapor from the vent chamber to the outlet when the air pressure in the control chamber is reduced to below a predetermined level by the vacuum source, first means for conducting air from the control chamber to the external vacuum source to allow the vacuum source to reduce the air pressure in the control chamber to below the predetermined level so that the vent valve moves to the open position allowing fuel vapor to vent from the vent chamber through the outlet chamber, second means for conducting air from the control chamber to the vent chamber to reduce the air pressure in the control chamber to below the predetermined level in response to the reduction of fuel vapor pressure in the vehicle fuel tank, the second conducting means extending through the vent valve, and a relief valve positioned in the second conducting means, the relief valve being movable between a closed position preventing conduction of air from the control chamber to the vent chamber and an open position allowing conduction of air from the control chamber to the vent chamber so that the vent valve is moved from its closed position to its open position allow air to flow from the outlet chamber into the vent chamber so that the fuel vapor pressure in the vehicle fuel tank returns to the predetermined level.

42. The apparatus of claim 41, wherein the second conducting means includes a valve seat for the relief valve.

43. The apparatus of claim 41, wherein the second conducting means is formed to include a relief valve chamber and the relief valve is positioned in the relief valve chamber and sized relative to the relief valve chamber for movement therein between the closed position and the open position.

44. The apparatus of claim 41, wherein the relief valve is a ball and the second conducting means includes an annular conical member providing a seat for the ball.

45. An apparatus for controlling discharge of fuel vapor from an aperture in a vehicle fuel tank, the apparatus comprising a hollow housing including a bottom housing portion and a top housing portion connected to the bottom housing portion to define a hollow interior therebetween, the bottom housing portion including a hollow neck extending into the fuel tank through the aperture formed in the fuel tank and containing fuel vapor extant in the fuel tank and a side discharge outlet, an insert situated in the hollow interior and connected to the bottom housing portion to provide a vent chamber, the insert being formed to provide inlet means for admitting fuel vapor in the hollow neck into the vent chamber, outlet means for discharging fuel vapor from the vent chamber into the side discharge outlet, the outlet means being appended to the bottom housing portion, a vent valve positioned in the hollow interior of the housing for movement between a closed position closing the outlet means to block flow of fuel vapor from the vent chamber into the side discharge outlet and an opened position allowing flow of fuel vapor from the vent chamber into the side discharge outlet, the vent valve cooperating with the top housing portion to define a venting control chamber therebetween, vacuum-developing means for developing a vacuum in the venting control chamber to move the vent valve relative to the top housing portion from its closed position to its opened position so that fuel vapor in the fuel tank is conducted through the hollow neck, inlet means, vent chamber, and outlet means into the side discharge outlet formed in the bottom housing portion, conduit means for communicating negative pressure from the fuel tank through the vent chamber, inlet means, outlet means, and vent valve to the venting control chamber to generate a vacuum in the venting control chamber without using the vacuum-developing means, and relief valve means for closing the conduit means at least when the fuel vapor pressure in the fuel tank is above atmospheric pressure so that the vacuum-developing means is operable to develop a vacuum in the venting control chamber sufficient to move the vent valve to its opened position to vent excess fuel vapor pressure in the fuel tank through the side discharge outlet and for opening the conduit means in response to reduction of fuel vapor pressure in the fuel tank to below a predetermined negative pressure level so that negative pressure in the fuel tank is communicated to the venting control chamber to generate a suction force moving the vent valve to its opened position to allow ambient air in the side discharge outlet to flow into the fuel tank through the outlet means, inlet means, and vent chamber to increase the fuel vapor pressure in the fuel tank.

46. The apparatus of claim 45, wherein the conduit means includes a tube extending through the vent valve and a hollow container coupled to the tube, the tube includes an inlet opening into the vent chamber and an outlet opening into the hollow container, and the relief valve means is situated in the hollow container.

47. The apparatus of claim 46, wherein the hollow container is formed to include an interior region and outlet means for communicating fluid between the interior region and the venting control chamber.

48. The apparatus of claim 47, wherein the hollow container further includes a valve seat in the interior region around the outlet means and the relief valve means is a ball movable in the interior region between a seated position on the valve seat closing the outlet means and an unseated position off the valve seat opening the outlet means.

49. The apparatus of claim 46, wherein the tube is mounted on the vent valve for movement therewith.

50. The apparatus of claim 46, wherein the relief valve means is a ball positioned in the hollow container and sized for movement therein in response to changes in pressure in the hollow container.

51. An apparatus for controlling discharge of fuel vapor from a vehicle fuel tank, the apparatus comprising a housing mounted in the aperture and formed to include a vent chamber receiving fuel vapor from the fuel tank, a control chamber, and an outlet chamber exposed to atmospheric pressure, means for providing a vent opening within the housing between the vent chamber and the outlet chamber, a flexible diaphragm valve forming a partition between the vent chamber and the control chamber and being movable between a closed position blocking flow of fuel vapor from the vent chamber to the outlet chamber and an open position allowing flow of fuel vapor from the vent chamber to the outlet chamber, the diaphragm valve being formed to include a central aperture, a tube extending through the central aperture to define a vacuum relief conduit connecting the vent chamber and the control chamber in fluid communication, means for coupling the tube to the flexible diaphragm so that the tube moves with the flexible diaphragm, and a relief valve positioned in the tube and movable in response to reduction of fuel vapor pressure in the fuel tank to below a predetermined level between a closed position blocking flow between the vent chamber and the control chamber and an open position allowing flow between the vent chamber and the control chamber to reduce the pressure in the control chamber so that the diaphragm valve moves from its closed to its open position allowing ambient air to flow from the outlet chamber to the vent chamber.

52. The apparatus of claim 51, further comprising means for using vacuum to move the diaphragm valve from the closed position to the open position, the using means extending into the housing.

53. The apparatus of claim 52, wherein the using means includes means for connecting the control chamber to a vacuum manifold of a vehicle engine so that vacuum is provided to the control chamber during operation of the vehicle to move the diaphragm valve to the open position.

54. The apparatus of claim 51, wherein the tube is formed to include a relief valve chamber and the relief valve is located in the relief valve chamber and sized relative to the relief valve chamber for movement therein between the closed position and the open position.

55. An apparatus for controlling discharge of fuel vapor from an aperture formed in a vehicle fuel tank, the apparatus comprising a housing, means for mounting the housing in the aperture formed in the vehicle fuel tank, means for providing a vent opening within the housing, means for communicating ambient air to the vent opening, a vent valve movable between a closed position blocking flow of fuel vapor from the fuel tank through the vent opening and an open position allowing flow of fuel vapor from the fuel tank through the vent opening, and means for using vacuum from the fuel tank to move the vent valve from its closed position to its open position so that ambient air flows from the communicating means through the vent opening to the fuel tank, the using means including a conduit extending through the vent valve and a relief valve movable in the conduit in response to the reduction of fuel vapor pressure in the fuel tank to below a predetermined level between an actuating position unblocking the conduit allowing use of vacuum to move the vent valve from its closed position to its open position and a non-actuating position blocking the conduit to prevent use of vacuum to move the vent valve.

56. The apparatus of claim 55, further comprising second means for using vacuum from an external source to move the vent valve from the closed position to the open position so that fuel vapor may vent from the fuel tank through the vent opening.

57. The apparatus of claim 55, further comprising a spring acting between the housing and the vent valve to bias the vent valve normally toward its closed position.

58. The apparatus of claim 57, wherein the spring is a coiled compression spring having an interior region and the relief valve is situated to lie in the interior region of the coiled compression spring.

59. The apparatus of claim 58, wherein the conduit is formed to include a first passageway opening into the vent chamber, and a laterally offset second passageway connecting to the first passageway and opening into the control chamber, and means in the second passageway for supporting the relief valve in its closed position.

60. The apparatus of claim 57, wherein the conduit includes a disk disposed between the vent valve and the spring so that the spring acts between the housing and the disk to bias the vent valve normally toward its closed position.

61. The apparatus of claim 55, wherein the conduit includes a housing formed to include a relief valve chamber and the relief valve is located in the relief valve chamber and sized relative to the relief valve chamber for movement therein between the actuating position and the non-actuating position in response to the reduction of fuel vapor pressure in the fuel tank to below a predetermined level.

62. The apparatus of claim 61, wherein the conduit is also formed to include a top opening and the conduit further includes cap means for engaging the housing to close the top opening and retain the relief valve in the housing.

63. The apparatus of claim 61, wherein the conduit is formed to include a first passageway extending through the vent valve and a second passageway offset from the first passageway and the relief valve chamber is located in the second passageway.

64. The apparatus of claim 63, wherein the conduit is formed to include means in the second passageway for supporting the relief valve in its closed position.

65. The apparatus of claim 55, wherein the conduit is formed to include a first passageway having an outer wall, a second passageway offset from the first passageway having an outer wall, and a cap supported by the outer wall of the first passageway and the outer wall of the second passageway and cooperating therewith to define a relief valve chamber for the relief valve.

* * * * *